United States Patent [19]

Carlhoff et al.

[11] Patent Number: 4,993,834
[45] Date of Patent: Feb. 19, 1991

[54] SPECTROMETER FOR THE SIMULTANEOUS MEASUREMENT OF INTENSITY IN VARIOUS SPECTRAL REGIONS

[75] Inventors: Christoph Carlhoff, Willich; Claus-Jürgen Lorenzen, Essen; Klaus-Peter Nick, Achim, all of Fed. Rep. of Germany

[73] Assignee: Fried. Krupp GmbH, Essen, Fed. Rep. of Germany

[21] Appl. No.: 411,820

[22] Filed: Sep. 25, 1989

[30] Foreign Application Priority Data

Oct. 3, 1988 [DE] Fed. Rep. of Germany ....... 3833602

[51] Int. Cl.⁵ ............................. G01J 3/28; G01J 3/18
[52] U.S. Cl. .................................................... 356/328
[58] Field of Search ............... 356/328, 334, 305, 319, 356/326, 300; 350/96.19

[56] References Cited

U.S. PATENT DOCUMENTS

| | | | |
|---|---|---|---|
| 3,880,523 | 4/1975 | Thomas | 356/79 |
| 4,320,972 | 3/1982 | Strasheim et al. | 356/328 |
| 4,784,935 | 11/1988 | Ehrfeld et al. | 430/321 |
| 4,838,645 | 6/1989 | Machler et al. | 350/96.19 |

FOREIGN PATENT DOCUMENTS

| | | |
|---|---|---|
| 0156232 | 10/1985 | European Pat. Off. . |
| 2739585 | 3/1978 | Fed. Rep. of Germany . |
| 2929883 | 2/1981 | Fed. Rep. of Germany . |
| 2590979 | 6/1987 | France . |

OTHER PUBLICATIONS

Yen et al., "Planar Rowland Spectrometer for Fiber-Optic Wavelength Demultiplexing", Dec. 1981, pp. 639–641, Optics Letters, vol. 6, No. 12.

Primary Examiner—F. L. Evans
Assistant Examiner—K. P. Hantis
Attorney, Agent, or Firm—Spencer & Frank

[57] ABSTRACT

A polychromator in a Paschen-Runge mounting in which intensity measurements are made by means of a row of photodiodes. The spectral intensity distribution of at least two spectral regions on the Rowland circle is transmitted to the row of photodiodes by image conductors and is measured there.

11 Claims, 2 Drawing Sheets

SPECTROMETER FOR THE SIMULTANEOUS MEASUREMENT OF INTENSITY IN VARIOUS SPECTRAL REGIONS

REFERENCE TO RELATED APPLICATIONS

This application claims the priority of Federal Republic of Germany application Ser. No. P 38 33 602.2 filed Oct. 3rd, 1988, which is incorporated herein by reference.

BACKGROUND OF THE INVENTION

In pulsed light sources or for time-critical applications, it is generally necessary to examine a spectrum simultaneously in various spectral regions. Polychromators including concave gratings in a Paschen-Runge mounting are customarily employed for this purpose. These polychromators have adjustable slits in which masks are arranged and the light intensity at the location of the slit is measured by means of photodetectors. The photodetectors measure the respective total intensity. The information about spectral resolution in the vicinity of the spectral line at the slit is lost.

In complicated spectra, the selected spectral lines may be interfered with considerably by lines from the same or another element being examined by the light source, and additionally, continuous radiation may contribute an amount to the total radiation which cannot be neglected. In these cases, knowledge of the spectral resolution in the vicinity of the spectral line is absolutely necessary since only in that way can the net line intensity of the selected line be determined.

A single spectral region can be measured simultaneously by means of one row of photodiodes having a high spectral and time resolution and accuracy. However, a respective additional row of photodiodes is needed for each other spectral region.

A row of photodiodes includes up to 2048 photodiodes which are arranged at spacings of 25 μm. These photodiodes simultaneously measure the light intensity present at their locations. In this way, a measurement is taken of the spectral intensity distribution of a spectral region.

SUMMARY OF THE INVENTION

It is therefore an object of the present invention to simultaneously measure the spectral intensity distribution of several different spectral regions with one row of photodiodes.

This is accomplished according to the invention by means of a row of photodiodes with which the intensity distribution of at least two spectral regions on the Rowland circle is transmitted at least in part by means of image conductors, to the row of photodiodes. With this arrangement, it is possible in an advantageous manner to measure the spectral intensity distributions of different, even widely separated spectral regions by means of a single row of photodiodes.

If it is not possible to transmit all spectral regions of interest from the Rowland circle to the row of photodiodes by means of image conductors, the row of photodiodes is placed directly on the Rowland circle in the spectral region in which image conductors are not suitable, with the spectral intensity distribution of the remaining spectral regions of interest being transferred to the row of photodiodes by means of image conductors.

For changing applications, i.e. if the spectral intensity distribution of different spectral regions is to be analyzed from measurement to measurement, it is of advantage for the image conductors to be movably arranged on the Rowland circle in a manner similar to the manner in which the photodetectors are moved in a Paschen-Runge mounting. The image conductors may then be arranged in each case that the intensity distributions of the spectral regions of interest are imaged on the row of photodiodes. The image conductors are placed either manually or by a microprocessor controlled drive according to the spectral regions of interest in each case.

To realize optimum utilization of the light intensity on the Rowland circle, the image conductor is advantageously configured as a cross section converter in which the individual fibers at the Rowland circle are arranged in a matrix having a rectangular cross section whose height corresponds to the height of the slit on the Rowland circle, each column of fibers of the matrix corresponding to a single photodiode and a single slit. Opposite the row of photodiodes, the image conductor advisably has a rectangular cross section corresponding to the cross section of the individual photodiodes. Moreover, for optimum transmission of the light intensity, the aperture number of each individual fiber must be considered so that all of the light of an image conductor can be received by the photodiode within its acceptance angle.

If the image conductor, which is composed of one or a plurality of individual fibers, cannot be made sufficiently thin at the Rowland circle due to the thickness of the individual fiber, or the cross section of the image conductor is not small enough at the row of photodiodes, the transmission of light is advantageously optimized by intermediate imaging. The intermediate imaging enlarges the image of the entrance slit on the Rowland circle corresponding to the cross section of the image conductor and reduces the effective cross section of the image conductor at the row of photodiodes so that all of the light from the image conductor is received completely by a single photodiode of the row of photodiodes. Additionally, the intermediate imaging of the image of the entrance slit permits the selection of a different resolution from spectral region to spectral region. In this way it is possible, for example, to optimize the number of photodiodes required.

The number of photodiodes required in the row of photodiode increases with the number and size of the desired spectral regions so that, under certain circumstances, several rows of photodiodes are required. To ensure simultaneous intensity measurements of all spectral regions of interest, these rows of photodiodes must all be actuated simultaneously.

BRIEF DESCRIPTION OF THE DRAWINGS

These and other aspects of the invention will be more completely understood from the following detailed description of the preferred embodiment with reference to the accompanying drawing in which.

DETAILED DESCRIPTION OF THE PREFERRED EMBODIMENT

Figure 1:
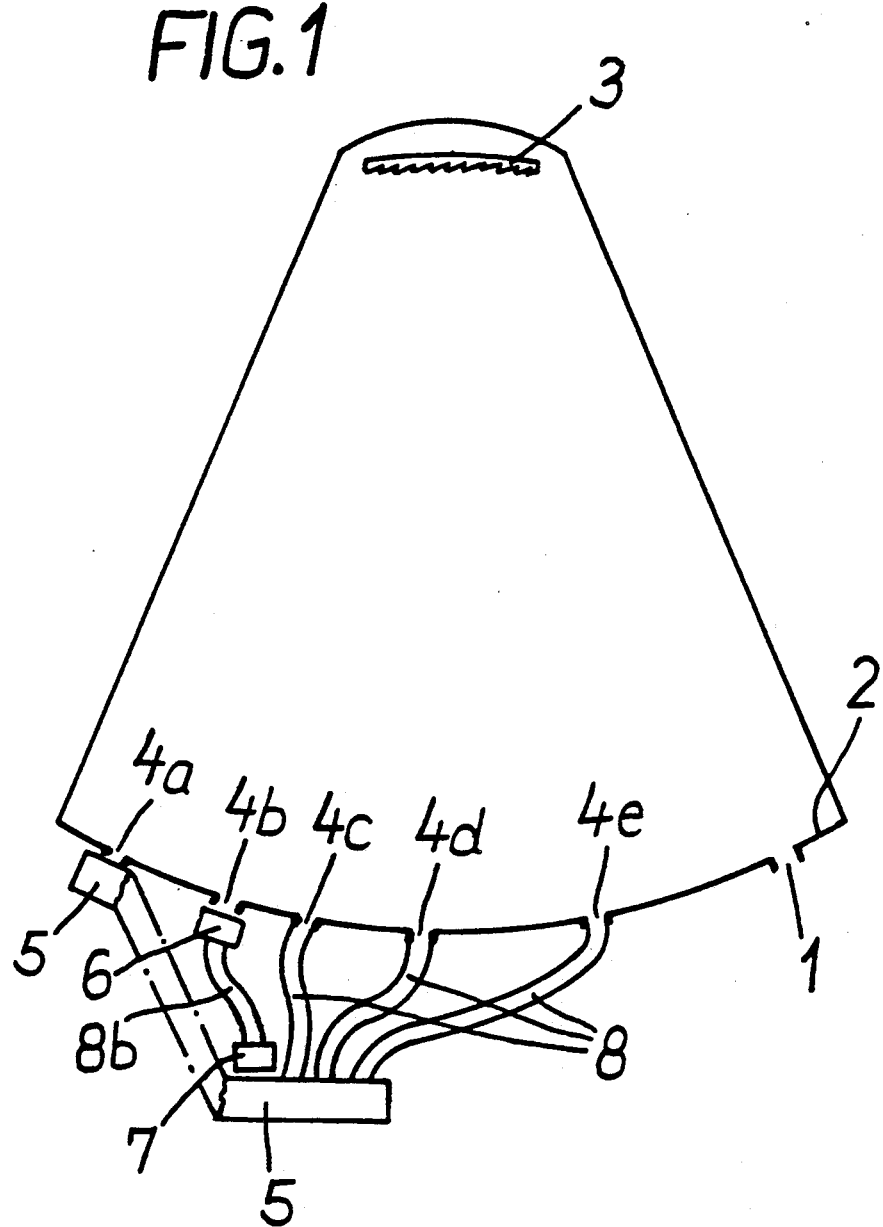
FIG. 1 is a schematic representation of an embodiment of the present invention.
Figure 2:
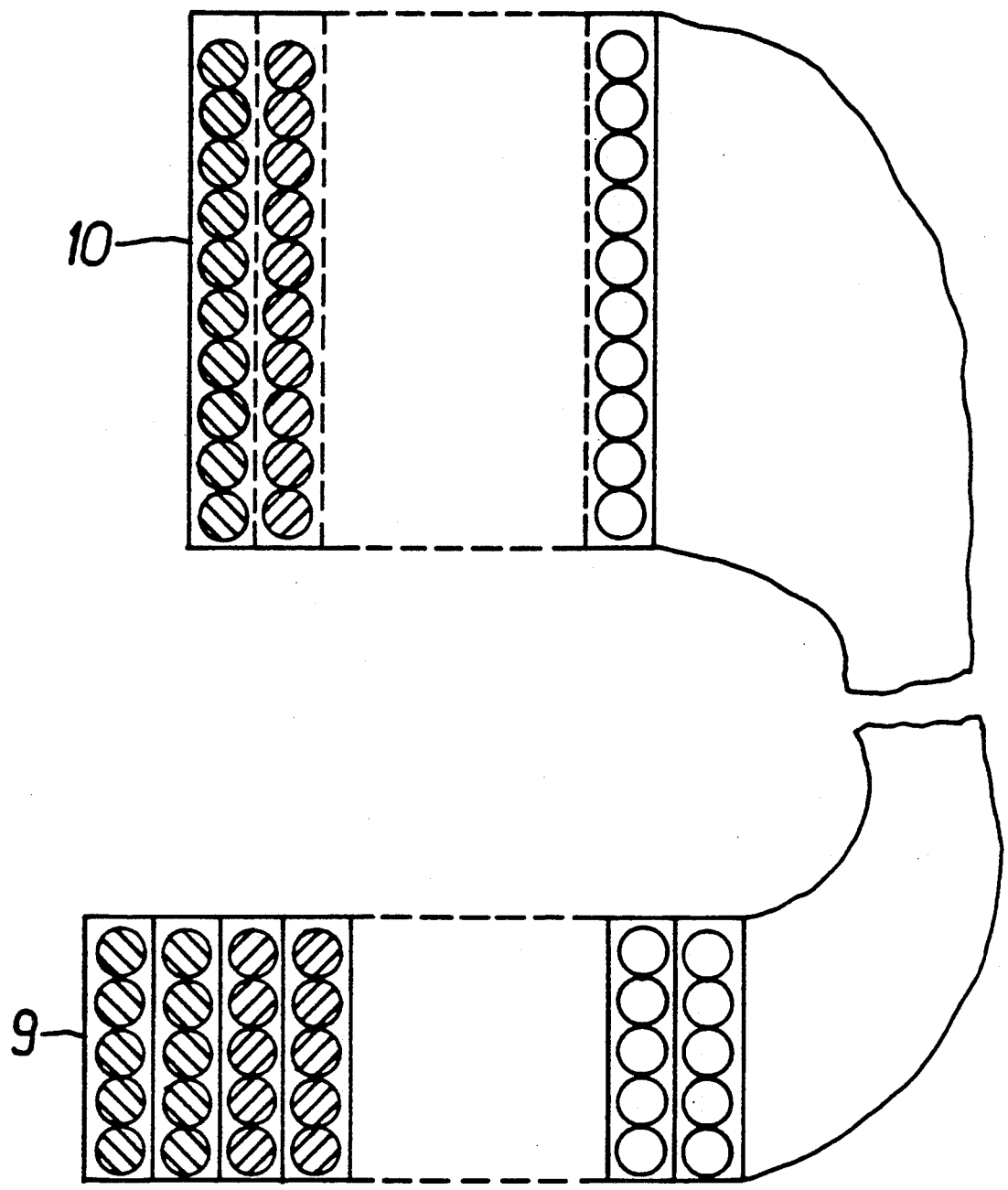
FIG. 2 illustrates an example of an image conductor configured as a cross sectional converter.

Referring to the drawing figures, there is shown a polychromator with a Paschen-Runge mounting wherein light to be analyzed is directed through an entrance slit 1 on a Rowland circle 2 onto a concave diffraction grating 3, and slits 4a–4e on the Rowland circle for the spectral regions of interest receive the diffracted light. A row 5 of photodiodes is shown in two parts so as to more clearly represent image conductors and optical systems between slits 4b–4e and the row of photodiodes not present between slit 4a and the row of photodiodes. At slit 4a, the row 5 of photodiodes is disposed directly on the Rowland circle. The spectral regions at slits 4b to 4e are imaged on the row of photodiodes 5 by means of respective image conductors 8 each of which is formed, for example, of one or a column of optical fibers. The image conductor 8b associated with slit 4b is provided with optical systems 6 and 7 for intermediate imaging since the grating spacing of image conductor 8b is 100 μm while the diameter of a photodiode in the row of photodiodes is 25 μm. Optical system 6 coupling the slit 4b with the entrance cross section of the image conductor 8b and, the optical system 7 coupling the image conductor 8b and a corresponding photodiode images the exit cross section of the image conductor 8b on the respective photodiode.

Alternatively to the optical systems 6 and 7, the cross sections of the respective image conductors 8b may be set at then respective opposite ends to perform the same function as the optical systems. That is, the image conductors 8 themselves may function as cross section converters by having one end 9 with a cross section equal to an acceptance cross section of the photodiode and an opposite end 10 with a height equal to the height of the spectral region on the Rowland Circle, i.e., the height of the respective output slit.

The light to be analyzed enters the polychromator at entrance slit 1, and is diffracted at grating 3 so that the spectrum is reproduced on Rowland circle 2. The spectral region of interest in slit 4a is imaged directly on the row of photodiodes while the spectral regions in slits 4b to 4e are imaged on the row of photodiodes by way of image conductors 8.

It will be understood that the above description of the present invention is susceptible to various modifications, changes and adaptations, and the same are intended to be comprehended within the meaning and range of equivalents of the appended claims.

What is claimed is:

1. In a polychromator having an entrance slit and a concave diffraction grating in a Paschen-Rung mounting on a Rowland circle, the improvement comprising:
   a row of photodiodes; and
   means, including image conductors coupling at least two areas on the Rowland circle and the row of photodiodes, for transmitting respective spectral regions of the at least two areas to the row of photodiodes so that the spectral intensity distribution of the at least two spectral regions is measured by the row of photodiodes, wherein each image conductor coupling an area of the Rowland circle and a photodiode is a cross section converter having on its one end a cross section equal to an acceptance cross section of the photodiode and on an opposite end a height equal to the spectral region at the area on the Rowland circle.

2. In a polychromator having an entrance slit and a concave diffraction grating in a Paschen-Runge mounting on a Rowland circle, the improvement comprising:
   a row of photodiodes;
   means, including image conductors coupling at least two areas on the Rowland circle and the row of photodiodes, for transmitting respective spectral regions at the at least two areas to the row of photodiodes so that the spectral intensity distribution of the at least two spectral regions is measured by the row photodiodes; and
   intermediates imaging means for imaging an image of the entrance slit on the image conductors.

3. In a polychromator having an entrance slit and a concave diffraction grating in a Paschen-Runge mounted on a Rowland circle, the improvement comprising:
   a row of photodiodes; and
   means, including image conductors coupling at least two areas on the Rowland circle and the row of photodiodes, for transmitting respective spectral regions at the at least two areas to the row of photodiodes so that the spectral intensity distribution of the at least two spectral regions is measured by the row photodiodes, wherein said transmitting means comprises intermediate imaging means for imaging cross sections of said image conductors on the cross sections of respective photodiodes, each by way of a respective intermediate image.

4. In a polychromator having an entrance slit and a concave diffraction grating in a Paschen-Runge mounting on a Rowland circle, the improvement comprising:
   a row of photodiodes; and
   means, including image conductors coupling at least two areas on the Rowland circle and the row of photodiodes, for transmitting respective spectral regions at the at least two areas to the row of photodiodes so that the spectral intensity distribution of the at least two spectral regions is measured by the row photodiodes, wherein said transmitting means includes a first intermediate imaging means, coupled to a corresponding one of said image conductors, on the Rowland circle, for enlarging an image of the entrance slit corresponding to a cross section of said image conductor and a second intermediate imaging means, coupling said image conductor to a single photodiode of said row of photodiodes, for reducing the effective cross section of said image conductor at said row of photodiodes so that all light from said image conductor is received completely by the single photodiode.

5. In a polychromator having an entrance slit and a concave diffraction grating in a Paschen-Runge mounting on a Rowland circle, the improvement comprising:
   a row of photodiodes; and
   means, including image conductors coupling at least two areas on the Rowland circle and the row of photodiodes, for transmitting respective spectral regions at the at least two areas to the row of photodiodes so that the spectral intensity distribution of the at least two spectral regions is measured by the row photodiodes, wherein said transmitting means includes a plurality of intermediate imaging means, coupled to corresponding ones of said image conductors, for imaging the entrance slit on respective ones of said photodiodes so as to adjust the resolution of the spectral intensity detected by said photodiodes from spectral region to spectral region.

6. In a polychromator having an entrance slit and a concave diffraction grating in a Paschen-Runge mounting on a Rowland circle, the improvement comprising:

a row of photodiodes, a first part of said row being disposed at a first area on the Rowland circle so as to measure directly the spectral intensity distribution of a first spectral region at said first area at said first part of said row; and means, including image conductors coupling a second area on the Rowland circle and a second part of said row of photodiodes, for transmitting a second spectral region at said second area to said second part of said row of photodiodes so that the spectral intensity distribution of the second spectral region is measured by said second part of said row of photodiodes.

7. A polychromator as in claim 6, wherein each image conductor coupling an area of the Rowland circle and a photodiode is a cross section converter having on its one end a cross section equal to an acceptance cross section of the photodiode and on an opposite end a height equal to the spectral region at the area on the Rowland circle.

8. A polychromator as defined in claim 6, further comprising intermediate imaging means for imaging an image of the entrance slit on the image conductors.

9. A polychromator as defined in claims 6, wherein said coupling means comprises intermediate imaging means for imaging cross sections of said image conductors on the cross sections of respective photodiodes, each by way of a respective intermediate image.

10. A polychromator as in claim 6, wherein said coupling means includes a first intermediate imaging means, coupled to a corresponding one of said image conductors, on the Rowland circle, for enlarging an image of the entrance slit corresponding to a cross section of said image conductor and a second intermediate imaging means, coupling said image conductor to a single photodiode of said row of photodiodes, for reducing the effective cross section of said image conductor at said row of photodiodes so that all light from said image conductor is received completely by the single photodiode.

11. A polychromator as in claim 6, wherein said coupling means includes a plurality of intermediate imaging means, coupled to corresponding ones of said image conductors, for imaging the entrance slit on respective ones of said photodiodes so as to adjust the resolution of the spectral intensity detected by said photodiodes from spectral region to spectral region.

* * * * *